United States Patent
Bose et al.

(10) Patent No.: US 10,375,058 B2
(45) Date of Patent: Aug. 6, 2019

(54) SECURE EFFICIENT REGISTRATION OF INDUSTRIAL INTELLIGENT ELECTRONIC DEVICES

(71) Applicant: ABB Schweiz AG, Baden (CH)

(72) Inventors: Arijit Bose, Makdampur (IN); Fernando Alvarez, Untersiggenthal (CH); Richard Deverson, Wettingen (CH)

(73) Assignee: ABB Schweiz AG, Baden (CH)

( * ) Notice: Subject to any disclaimer, the term of this patent is extended or adjusted under 35 U.S.C. 154(b) by 92 days.

(21) Appl. No.: 15/625,580

(22) Filed: Jun. 16, 2017

(65) Prior Publication Data
US 2017/0366537 A1   Dec. 21, 2017

(30) Foreign Application Priority Data

Jun. 16, 2016  (EP) .................................. 16174840

(51) Int. Cl.
*H04L 9/00* (2006.01)
*H04L 29/06* (2006.01)
(Continued)

(52) U.S. Cl.
CPC ........ *H04L 63/0823* (2013.01); *H04L 63/062* (2013.01); *H04L 63/067* (2013.01);
(Continued)

(58) Field of Classification Search
CPC . H04L 63/062; H04L 63/067; H04L 63/0823; H04L 63/0838; H04L 41/08; G06F 21/33; G06F 21/44
See application file for complete search history.

(56) References Cited

U.S. PATENT DOCUMENTS 9,930,028 B2 * 3/2018 Van Den Broeck ........................ H04L 63/0823
2012/0266209 A1 10/2012 Gooding et al.
(Continued)

FOREIGN PATENT DOCUMENTS

WO   2015000795 A1   1/2015

OTHER PUBLICATIONS

European Patent Office, Extended Search Report issued in corresponding Application No. 16174840.5, dated Aug. 1, 2016, 5 pp.
(Continued)

*Primary Examiner* — Beemnet W Dada
(74) *Attorney, Agent, or Firm* — Taft Stettinius & Hollister LLP; J. Bruce Schelkopf

(57) ABSTRACT

A method for registering an intelligent electronic device with a certification authority. The method includes enrolling a configuration tool at the certification authority; generating a one-time password for the intelligent electronic device and storing the one-time password in the certification authority and in the configuration tool; connecting to the intelligent electronic device with the configuration tool, wherein the configuration tool authenticates at the intelligent electronic device; sending the one-time password from the configuration tool to the intelligent electronic device; enrolling the intelligent electronic device at the certification authority with the one-time password and registering the intelligent electronic device with the certification authority; and receiving a device certificate from the certification authority in the intelligent electronic device.

14 Claims, 1 Drawing Sheet

(51) Int. Cl.
  *G06F 21/33* (2013.01)
  *G06F 21/44* (2013.01)
  *H04L 29/08* (2006.01)

(52) U.S. Cl.
  CPC .......... *H04L 63/0838* (2013.01); *G06F 21/33* (2013.01); *G06F 21/44* (2013.01); *H04L 67/12* (2013.01); *Y04S 40/18* (2018.05); *Y04S 40/24* (2013.01)

(56) References Cited

U.S. PATENT DOCUMENTS

| | | |
|---|---|---|
| 2013/0132721 A1 | 5/2013 | Busser et al. |
| 2013/0145449 A1 | 6/2013 | Busser et al. |
| 2016/0112406 A1 | 4/2016 | Bugrov et al. |

OTHER PUBLICATIONS

Gutmann et al., "Simple Certificate Enrolment Protocol," Mar. 15, 2016, pp. 1-39, retrieved from the internet: https://www.ietf.org/id/draft-gutmann-scep-02.txt.

International Electrotechnical Commission; Power systems management and associated information exchange—Data and communications security; IEC 62351-9; Edition 1.0; May 2017; 90 pgs.; Geneva, Switzerland.

\* cited by examiner

SECURE EFFICIENT REGISTRATION OF INDUSTRIAL INTELLIGENT ELECTRONIC DEVICES

FIELD OF THE INVENTION

The invention relates to a method, a computer program and a system for registering an intelligent electronic device with a certification authority.

BACKGROUND OF THE INVENTION

Cyber security requirements for utilities and for the so-called "Smart Grid" are becoming more and more important. For example, the standard IEC (International Electrotechnical Commission) 62351-9 describes how keys, certificate enrollment, generation and revocation shall be managed in automation industries.

A digital (X.509) certificate is a form of digital identity. Digital certificates are used for several purposes including authentication of users, processes and devices. It is therefore important that the distribution of certificates is done securely. The challenge is to provide an efficient distribution process while also ensuring that malicious intelligent electronic devices do not receive a valid certificate.

To ensure that only valid intelligent electronic devices get a valid certificate, the intelligent electronic devices may need to hold/present some form of valid credentials. One-time passwords are typically the credentials used by devices when performing their initial certificate signing request. The registration data usually is passed to the intelligent electronic devices via configuration tools manually and individually, in an out of band mechanism, where an authorized engineer or cyber security administrator pushes the registration data from a storage media (e.g. USB Stick) into each intelligent electronic device as part of the device configuration.

For example, US 2013 0 145 449 A1 and US 2013 0 132 721 A1 relate to a solution using a USB-Stick or CD to distribute one-time passwords to intelligent electronic devices. A one-time password is used in a proprietary way to add tamper protection to the certificate signing request data.

However, installing the registration data in every single device may be very labour intensive and error prone.

DESCRIPTION OF THE INVENTION

It is an objective of the invention to provide an efficient method for the initial configuration of an intelligent electronic device with registration data for enrolling with a certification authority.

This objective is achieved by the subject-matter of the independent claims. Further exemplary embodiments are evident from the dependent claims and the following description.

A first aspect of the invention relates to a method for registering an intelligent electronic device with a certification authority.

An intelligent electronic device may be any device comprising programmable hardware that is communicatively connected with a power electric and/or electronic device. For example, the intelligent electronic device may be an embedded device directly controlling an electronic device and/or receiving measurement data from the electronic device. It also may be possible that the intelligent electronic device is remote from the electronic device and or adapted for transmitting data from and/or to the electronic device. An intelligent electronic device may be employed in industrial processes.

A certification authority may be a computing device, such as a server, providing a certification authority and optionally a registration authority, which may provide a public key infrastructure. A certification authority may issue digital certificates. The registration authority may act as a front end for the certification authority, authenticating a certificate enrollment request and passing only an authenticated request on to the certification authority which then issues the corresponding digital certificate. A certification authority may not directly handle certificate enrollment requests.

A digital certificate or simply certificate may comprise a set of data that uniquely identifies a key pair, i.e. a public key and a private key for encryption and an owner. The certificate may contain a public key of the owner of the certificate and optionally other information. The certificate may be digitally signed by the certification authority, thereby binding the public key to the owner. Digital signing may refer to a cryptographic transformation of data that provides a mechanism for verifying origin authentication, data integrity, and signatory non-repudiation of the data.

According to an embodiment of the invention, the method comprises: enrolling a configuration tool at the certification authority. The configuration tool may be software running on a configuration device, which may be a laptop or PC or other computing device. The configuration tool may establish a communication connection with the certification authority, for example via Internet. The communication connection may be secure and/or the configuration tool may have to authenticate at the certification authority.

According to an embodiment of the invention, the method further comprises: generating a one-time password for the intelligent electronic device and storing the one-time password for the intelligent electronic device in the certification authority and in the configuration tool. The one-time password may be generated by the certification authority, the configuration tool or a further device. The generated one-time password may be supplied with registration data, for example by the configuration tool. The one-time password may be stored in the certification authority together with data about the intelligent electronic device.

Usually, the one-time passwords for a plurality of intelligent electronic devices may be generated, such as all intelligent electronic devices of a specific plant or facility. These one-time passwords all may be different.

Prior to configuring any intelligent electronic device, the configuration tool may be enrolled with the public key infrastructure, i.e. registration/certification authority, of the owner of the intelligent electronic device. It has to be noted that this owner does not need to be the manufacturer of the intelligent electronic device, which may not be able to customize the intelligent electronic device with the correct registration data. The enrollment may permit the configuration tool to securely generate and/or request one-time passwords "on behalf" of the one or more intelligent electronic devices. So trust can be established between the certification authority and the configuration tool. Here and in the following, trust may refer to a characteristic of an entity that indicates its ability to perform certain functions or services correctly, fairly, and impartially, along with assurance that the entity and its identifier are genuine.

According to an embodiment of the invention, the method further comprises: connecting to the intelligent electronic device with the configuration tool, wherein the configuration tool authenticates at the intelligent electronic device; and sending the one-time password from the configuration tool to the intelligent electronic device. In a next step, the configuration tool may establish a communication connection with the intelligent electronic device, for example via Internet. The communication connection may be secure and/or the configuration tool may have to authenticate at the intelligent electronic device, such that trust may be established between the configuration tool and the intelligent electronic device. The one-time password then may be sent to the respective intelligent electronic device via the trusted communication connection. The one-time password and optionally further registration data corresponding to the registration process of the intelligent electronic device at the certification authority may be stored in the intelligent electronic device.

According to an embodiment of the invention, the method further comprises: enrolling the intelligent electronic device with the certification authority with the one-time password and registering the intelligent electronic device in the certification authority; and receiving a device certificate from the certification authority in the intelligent electronic device. With the one-time password and with the optional further registration data, the intelligent electronic device may establish a communication connection with the certification authority, for example via Internet, and may authenticate at the certification authority with the one-time password. The certification authority then may send the digital device certificate to the intelligent electronic device. Since the certification authority has provided the one-time password to the configuration tool in a secure way or has received the one-time password in a secure way, and the intelligent electronic device is already listed in the certification authority together with the one-time password, also a trusted communication connection between the intelligent electronic device and the certification authority may be established. It may not be possible that an intelligent electronic device not enabled by the configuration tool may receive a certificate from the certification authority.

The method may be performed during the installation process of the intelligent electronic device at its final site. With the method productivity and security of the initial device, installation process may be improved.

It has to be noted that for granting security of the method, it may have to be assumed that standard cyber security practices apply, such as physical security, network perimeter protection, intrusion detection, authentication, patch management, etc.

The method also is compliant with the IEC 62351-9 standard, a standard for key management of power systems and describing how digital certificates and group symmetrical session keys shall be managed for securing power systems. The standard IEC 62351-9 specifies how intelligent electronic devices shall perform their certificate enrollment with a registration/certification authority before becoming operational. In particular, the enrollment of the intelligent electronic device at the certification authority as described above and below may be performed according to the standard IEC 62351-9.

The standard also specifies that each intelligent electronic device shall be configured with its own "registration/certification authority registration data". However, the standard does not mention an efficient and secure way to do this configuration.

According to an embodiment of the invention, the configuration tool requests a configuration certificate from the certification authority. It may be possible that the enrollment of the configuration tool is based on the same public key infrastructure as the one of the intelligent electronic devices. In such a way, the configuration tool also may receive a digital certificate that may be used for authenticating the configuration tool anytime it requests a one-time password from the certification authority. For example, for requesting the one-time password, the configuration tool authenticates itself at the certification authority with the configuration certificate.

According to an embodiment of the invention, the one-time password is generated by the certification authority and sent to the configuration tool. For example, the configuration tool may request a one-time password for the intelligent electronic device from the certification authority. In this case, the one-time password may be encrypted by the certification authority with the configuration certificate of the configuration tool. This may provide further security additionally to a secure communication connection.

According to an embodiment of the invention, the method further comprises: requesting an authentication from a user of the configuration tool and authorising the user by the certification authority for the configuration tool. It may be possible that the user, which operates the configuration tool additionally may have to, for example manually, authenticate at the certification authority. Thus, the configuration tool and the user may have to authenticate, in particular with different methods.

The configuration tool may authenticate the user of the configuration tool via a user identification and a user password. Only authenticated and authorized users may be able to request one-time passwords and/or to send the one-time passwords to the intelligent electronic devices.

According to an embodiment of the invention, the one-time password is requested online via a secure communication connection. As already mentioned, the communication connection between the configuration tool and the certification authority may be provided via a secure Internet connection, for example via a TLS (Transport Layer Security) and/or HTTPS connection. In particular, the one-time password may be requested and/or sent to the configuration tool via TLS and/or HTTPS.

However, it also may be possible that the one-time password is transported to the configuration tool in another way, for example in a file, which is saved in a transportable storage medium, such as an USB stick or an external hard drive.

According to an embodiment of the invention, the configuration tool authenticates at the intelligent electronic device with a user password. It may be possible that the user enters the user password of the intelligent electronic device into the configuration tool, which then sends it to the intelligent electronic device. It also may be possible that the user password for the intelligent electronic device is stored in the configuration tool. For example, the user password for the authentication of the configuration tool at the intelligent electronic devices may be a standard password used for more than one intelligent electronic device. For example, the user password may be based on an administrator factory default account.

It may be possible that the configuration tool may not be able to automatically authenticate at the intelligent electronic device. But an intelligent electronic device, which may need to be configured for the first time, may have a specific IP address, which may be a factory default, and which may be used to address a specific device.

According to an embodiment of the invention, the configuration tool is connected with the intelligent electronic device via a secure communication connection, which may be an Internet connection. The one-time password may be sent from the configuration tool to the intelligent electronic device via a TLS and/or HTTPS connection. For example, the configuration tool may transfer the one-time passwords securely to the respective intelligent electronic devices via a TLS and/or HTTPS connection.

According to an embodiment of the invention, the one-time password is included in configuration data sent to the intelligent electronic device. For example, the configuration data furthermore may include at least one of an address of the certification authority and/or a root certificate of the certification authority. The one-time password may be sent to the intelligent electronic device during an initial device configuration.

The configuration data may comprise further information that may be used for enrolling the intelligent electronic device at the certification authority, such as the IP address of the certification authority, a name and/or site of the intelligent electronic device, and in general data that may be included in the certificate signing request of the intelligent electronic device and/or will be part of the device certificate.

According to an embodiment of the invention, enrolling the intelligent electronic device at the certification authority is based on the Simple Certificate Enrollment Protocol. The SCEP (Simple Certificate Enrollment Protocol) is also mentioned in the standard IEC 62351-9. The SCEP may support a secure issuance of certificates to intelligent electronic devices in a scalable manner, using existing technologies whenever possible. The protocol supports the following operations: registration/certification authority public key distribution, certificate enrollment, certificate revocation, certificate query and CRL (certification revocation list) query.

According to an embodiment of the invention, enrolling the intelligent electronic device at the certification authority is based on the Enrollment over Secure Transport (EST) protocol as described in RFC 7030.

According to an embodiment of the invention, the method further comprises: providing the configuration tool with a list of intelligent electronic devices; requesting different one-time passwords for the intelligent electronic devices in the list; and enrolling every intelligent electronic device from the list at the certification authority with its one-time password. It may be possible that a possible large number of intelligent electronic devices is enrolled with the certification authority with one configuration tool. A user of the configuration tool need not personally visit every intelligent electronic device but may configure them from one site, which may be remote from the intelligent electronic devices.

According to an embodiment of the invention, the intelligent electronic device is adapted for controlling a power electric device. For example, the power electric device may be an embedded controller of a power electric device. A power electric device may be an electromechanical and/or electronic device adapted for processing currents above 10 A. However, the intelligent electronic device also may be part of any industrial automation system, for example, may be adapted for controlling a robot.

Further aspects of the invention relates to a computer program, which is adapted for performing the method as described in the above and in the following, and to a computer-readable medium, in which such a computer program is stored.

The computer program may comprise a configuration tool that is executed on a configuration device and configuration software executed on the intelligent electronic device.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a system for registering intelligent electronic devices with a certification authority, which comprises a configuration tool and/or a plurality of intelligent electronic devices, which may be adapted for performing the method as described in the above and in the following.

According to an embodiment of the invention, the configuration tool and/or the configuration device is adapted for: enrolling at the certification authority, for requesting a one-time password for each of the intelligent electronic devices from the certification authority or for providing a one-time password for each of the intelligent electronic devices to the certification authority; connecting to each of the intelligent electronic devices and authenticating at the respective intelligent electronic device; and sending the respective one-time password to the respective intelligent electronic device.

According to an embodiment of the invention, each intelligent electronic device and/or the configuration software of the intelligent electronic device is adapted for: enrolling at the certification authority with the one-time password; and receiving a device certificate from the certification authority.

According to an embodiment of the invention, the configuration tool, the intelligent electronic devices and the certification authority are interconnected via a data communication network, such as the Internet, an Intranet, etc. The intelligent electronic devices all may be interconnected devices of a plant or a facility. The configuration device and the certification authority may be remote from each other and remote from the intelligent electronic devices.

It has to be understood that features of the method as described in the above and in the following may be features of the system, the computer program and/or the computer-readable medium, as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
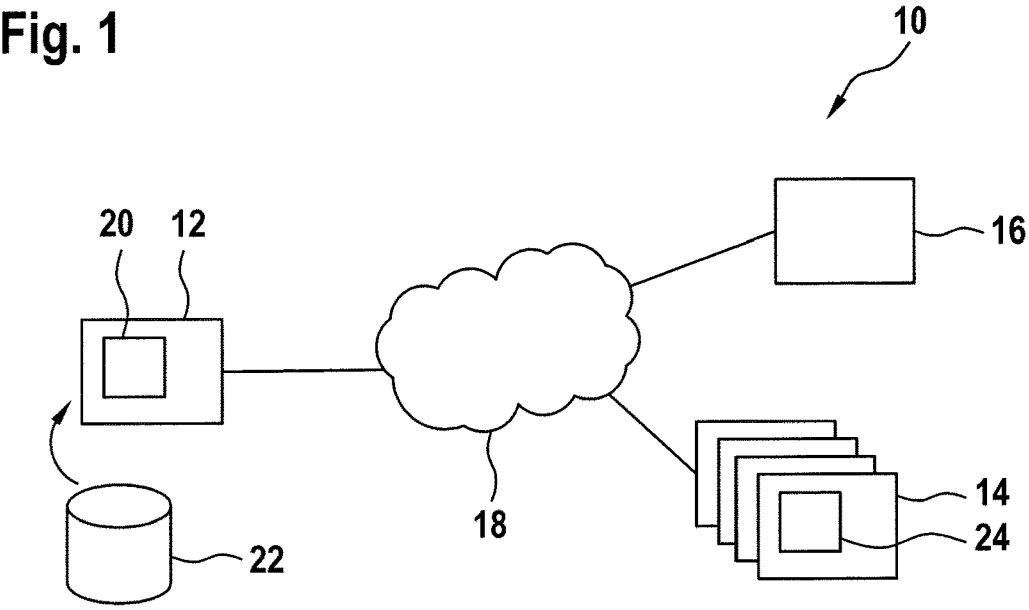
FIG. 1 schematically shows a registration system according to an embodiment of the invention.

FIG. 1 shows a system 10 comprising a configuration device 12 with a configuration tool 20, a plurality of intelligent electronic devices 14, and an RA/CA (registration authority/certification authority) host 16, which are interconnected via Internet 18.

The configuration device 12 may be a PC, laptop or similar computing device, in which a configuration tool 20 is executed that is adapted for configuring the intelligent electronic devices 14 as described above and below.

The configuration device 12 and the configuration tool 20 may have access and/or may store system configuration data 22, which contains information about the intelligent electronic devices 14 to be configured. For example, the system configuration data 22 may comprise a list of the intelligent electronic devices 14, which should be configured, their names, their IP addresses, etc.

An intelligent electronic device 14 may be any computing device adapted for communicating with a power electric device. It may be possible that the intelligent electronic device 14 is an embedded device. The intelligent electronic devices 14 all may be devices installed in a plant or facility and which have to be configured after installation.

Each intelligent electronic device 14 also may execute a configuration software 24, adapted for receiving configuration data from the configuration tool 20 and for registering the intelligent electronic device 14 at the RA/CA host 16.

Also the RA/CA host 16, which may be a web server, may be provided by any computing device, such as a hardware server or a virtual server of a cloud computing facility. The RA/CA host 16 provides a registration authority and a certification authority, which may be used as a public key infrastructure for the system 10. The certification authority may issue digital certificates for entities such as the configuration tool 20 and the intelligent electronic devices 14.

Figure 2:
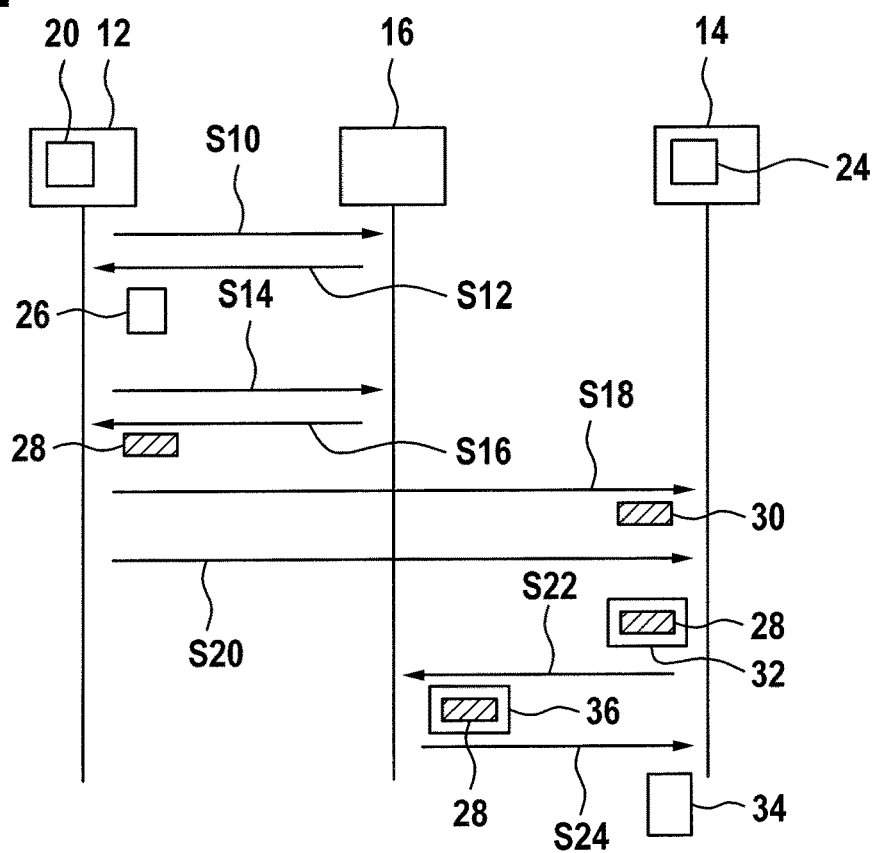
FIG. 2 depicts an interaction between components of the system 10 illustrating a registration method according to an embodiment of the invention.

FIG. 2 shows the interaction between the configuration device 12 with the configuration tool 20, the RA/CA host 16 and one of the intelligent electronic devices 14 with its configuration software 24.

FIG. 2 illustrates a method for registering the intelligent electronic devices 14 in the RA/CA host 16.

The method may be performed after the installation of the intelligent electronic devices 14, which may have a default configuration. In the beginning, the intelligent electronic devices 14 may have not been initialized and/or may have their factory default, which may include default user credentials (such as a default administrator user name and user password).

In step S10, the configuration tool 20 enrolls at the RA/CA host 16, which may be part of a public key infrastructure environment of an owner of the plant or facility, in which the intelligent electronic devices 14 and the associated electronic devices are employed. In particular, the configuration tool 20 enrolls with the same RA/CA host 16 as the intelligent electronic devices 14 will later do.

During enrollment, the configuration tool 20 requests a configuration certificate 26 from the RA/CA host 16.

The configuration tool 20 may have to authenticate with the certification authority of the RA/CA host 16 to request the certificate 26. This may be performed manually by an RA/CA administrator and/or with credentials provided by a user of the configuration tool 20.

The configuration tool 20 may generate a public and private key pair, and may use these to create a certificate signing request for the certification authority of the RA/CA host 16.

In general, a Certificate Signing Request (CSR) message may be required for requesting a new certificate or renewing a certificate. When the generated certificate signing request message is submitted to a certification authority, the certification authority signs the certificate signing request message using its private key and the certificate signing request may become the certificate.

A public and private key pair are used in asymmetric cryptography. The public and private key may be two related keys, which are used to perform complementary operations, such as encryption and decryption or signature generation and signature verification.

A private key may be a cryptographic key, which is used with a public key cryptographic algorithm that is uniquely associated with an entity and is not made public. A private key may be used to compute the corresponding public key, to compute a digital signature that may be verified by the corresponding public key, to decrypt data that was encrypted by the corresponding public key, and/or to compute a piece of common shared data, together with other information.

In step S12, after verification of the request of the configuration tool 20, the configuration certificate 26 generated by the RA/CA host 16 may be received and stored in the configuration device 12.

In step S14, a one-time password 28 for an intelligent electronic device 14 is generated and stored in the configuration tool 20 and the RA/CA host 16. For example, the configuration tool 20 may generate the one-time password 28 and may send it to the RA/CA host 16 via the established trusted communication connection. It also may be possible that the configuration tool 20 requests a one-time password 28 for an intelligent electronic device 14 from the RA/CA host 16. In particular, the configuration tool 20 may generate and send or may request and retrieve unique one-time passwords for each intelligent electronic device 14 listed in the system configuration data 22. This may be performed automatically. For example, the system configuration data 22 may comprise a list of intelligent electronic devices 14 that should be configured and the configuration tool 20 may generate or request a one-time password for every intelligent electronic device 14 in the list.

For sending a one-time password 28 or for requesting a one-time password 28, the configuration tool 20 may authorize itself at the RA/CA host 16 with the configuration certificate 26. The configuration tool 20 may authenticate itself towards the RA/CA host 16 by presenting the certificate 26 that the configuration tool 20 received in steps S10 and S12. The RA/CA host 16 may authenticate the one-time password request using the certificate 12 of the configuration tool 20.

It may be that a secure communication connection is established between the configuration tool 20 and the RA/CA host 16, for example via a TLS and/or HTTPS connection. A TLS connection between the configuration tool 20 and the RA/CA host 16 may be based on mutual authentication.

In step S16, before sending the one-time password to the configuration tool 20, the RA/CA host 16 may request an authentication from a user of the configuration tool 20 and may authorise the user.

Alternatively or additionally, the user of the configuration tool 20 may be authenticated and authorised by the RA/CA host 16 before any one-time password request is granted. The configuration tool 20 may prompt the user to enter a username/password which will be sent to the RA/CA host 16, for example via TLS and/or HTTPS, for authentication of the user requesting the one-time password.

Each one-time password request may be logged in the RA/CA host 16, optionally together with the user identity performing the request.

Additionally or alternatively to a secure communication connection, the one-time password 28 may be encrypted by the RA/CA host 16, for example with the configuration certificate 26 of the configuration tool 20. In such a way, only a particular configuration tool 20 may read the one-time password.

In step S18, the configuration tool 20 establishes a communication connection with the intelligent electronic device 14 and connects to the intelligent electronic device 14, wherein the configuration tool 20 authenticates at the intelligent electronic device 14.

It may be that in the default device configuration, the intelligent electronic devices 14 may be in a secure private network, or in no network at all. The configuration tool 20 may connect to a factory default IP address of the intelligent electronic device 14 in a peer to peer connection, since it may be possible that IP-address/DNS of the intelligent electronic device 14 has not been configured.

It may be possible that the configuration tool 20 is connected with the intelligent electronic device 14 via a secure communication connection, for example a TLS and/or HTTPS connection.

It has to be noted that users, responsible for configuring intelligent electronic devices 14, may connect to the intelligent electronic devices 14 directly using the configuring tool 20. It is not necessary that the user visits the intelligent electronic device 14 at its site.

The configuration tool 20 may authenticate at the intelligent electronic device 14 with a user password 30. This user password 30 may be a standard password used for more than one intelligent electronic device 14, for example of a factory default administrator. For automation purposes, auto-authentication is also possible.

Since the factory default administrator credentials (username and user password) may be publicly known, theoretically, any malicious tool may be able to configure an intelligent electronic device 14. However, such an intelligent electronic device 14 will not be able to enroll with the RA/CA host 16, because the one-time password 28 must come from an enrolled configuration tool 20, which has been authenticated with the RA/CA host 16.

In step S20, once authentication between the configuration tool 20 and the intelligent electronic device 14 is successful, the configuration tool 20 sends the one-time password 28 to the intelligent electronic device 14. The one-time password 28 may be included in device configuration data 32 sent to the intelligent electronic device 14 by the configuration tool 20. This device configuration data 32 may be based on information stored in the configuration tool 20 and/or the system configuration data 22.

The device configuration data 32 and in particular the one-time password 28 may be sent from the configuration tool 20 to the intelligent electronic device 14 via a TLS and/or HTTPS connection. It may be that the configuration device 12 writes the controller configuration data 32 to the intelligent electronic device 14.

The device configuration data 32 may furthermore comprise connection data specifying the actual device IP address or addresses, which may be used to change from the factory default IP address, one or more trust anchors for the device, such as a root certificate of the RA/CA host 16 and/or an address of the RA/CA host 16, where the intelligent electronic device 14 shall enroll.

In step S22, the intelligent electronic device 14 enrolls at the RA/CA host 16 with the one-time password 28 and is registered in the RA/CA host 16, when the one-time password is valid for the intelligent electronic device 14.

The one-time password may be included into RA/CA registration data 36, which also may contain additional data like a public key, a name, an identifier, etc. of the intelligent electronic device 14. The RA/CA data may be created by the intelligent electronic device 14 from the device configuration data 32.

In step S24, after the RA/CA host 16 had checked the validity of the RA/CA registration data 36, i.e. whether the password has not been used and/or matches to the other data in the RA/CA registration data 36, such as a name, identifier and/or IP address of the intelligent electronic device, the RA/CA host 16 creates a device certificate 34 for the intelligent electronic device 14 and sends it to the intelligent electronic device 14.

In the end, the device certificate 34 is received and stored in the intelligent electronic device 14 and may be used for authenticating the intelligent electronic device 14 in all future communication with other intelligent electronic devices 14 and/or components of the system 10.

The enrollment of the intelligent electronic device 14 at the RA/CA host 16 in step S22 and step S24 may be based on the Simple Certificate Enrollment Protocol (SCEP), which is considered here as example.

SCEP, which is also mentioned in the standard IEC 62351-9, provides the certificate enrollment process for an intelligent electronic device 14. However, SCEP does not specify how the one-time password or the RA/CA registration data is provided to the intelligent electronic device 14.

To comply with SCEP, device configuration data 32, which may be equal to the RA/CA registration data 36, is generated. This device configuration data may comprise credentials of the device like its name, organization name and any other useful information. In addition to these credentials, this device configuration data also comprises the unique one-time password 28. This one-time password 28 is used later to authenticate the intelligent electronic device 14, when it is enrolling to the RA/CA host 16.

The intelligent electronic device 14 may generate a key pair, i.e. a public and private key. Devices 14, which may have a low entropy, may get their randomness (seed) for generating the key pair or the key pair from an external source.

Furthermore, the intelligent electronic device 14 may generate a certificate signing request message that contains the one-time password 28. The contents of the certificate signing request message may be encoded and encrypted by using the SCEP protocol cryptographic protection, which makes the one-time password 28 secured and unexposed to any attackers. After that, the certificate signing request message may be sent to the RA/CA host 16.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 registration system
12 configuration device
14 intelligent electronic device
16 RA/CA host
18 Internet
20 configuration tool
22 system configuration data
24 device configuration software
26 26 configuration certificate
28 one-time password
30 user password
32 device configuration data
34 device certificate
36 registration data

The invention claimed is:

1. A method for registering an intelligent electronic device with a certification authority, the intelligent electronic device being adapted for controlling a power electric device and being an embedded controller of a power electric device, the method comprising:
    enrolling a configuration tool at the certification authority;
    generating a one-time password for the intelligent electronic device and storing the one-time password in the certification authority and in the configuration tool, wherein the configuration tool requests a configuration certificate from the certification authority, the configuration tool authenticates itself at the certification authority with the configuration certificate, and the one-time password is encrypted with the configuration certificate of the configuration tool;
    connecting to the intelligent electronic device with the configuration tool, wherein the configuration tool authenticates at the intelligent electronic device;
    sending the one-time password from the configuration tool to the intelligent electronic device, wherein the one-time password is included in configuration data sent to the intelligent electronic device, wherein the configuration data furthermore includes at least one of an address of the certification authority and/or a root certificate of the certification authority;
    enrolling the intelligent electronic device at the certification authority with the one-time password and registering the intelligent electronic device with the certification authority, wherein the one-time password is included into RA/CA registration data created by the intelligent electronic device from the configuration data;
    receiving a device certificate from the certification authority in the intelligent electronic device.

2. The method of claim 1, further comprising:
    requesting an authentication from a user of the configuration tool and authorising the user by the certification authority for the configuration tool.

3. The method of claim 1,
    wherein the one-time password is requested online via a secure communication connection;
    wherein the one-time password is requested via a TLS and/or HTTPS connection.

4. The method of claim 1,
    wherein the configuration tool authenticates at the intelligent electronic device with a user password;
    wherein the user password for the authentication of the configuration tool at the intelligent electronic device is a standard password used for more than one intelligent electronic device.

5. The method of claim 1,
    wherein the configuration tool is connected with the intelligent electronic device via a secure communication connection;
    wherein the one-time password is sent from the configuration tool to the intelligent electronic device via a TLS and/or HTTPS connection.

6. The method of claim 1,
    wherein enrolling the intelligent electronic device with the certification authority is based on the Simple Certificate Enrolment Protocol or the Enrollment over Secure Transport protocol.

7. The method of claim 1, further comprising:
    providing the configuration tool with a list of intelligent electronic devices;
    generating different one-time passwords for the intelligent electronic devices in the list;
    enrolling every intelligent electronic device from the list at the certification authority with its one-time password.

8. A non-transitory computer readable medium containing a computer program, which is adapted for performing a method for registering an intelligent electronic device with a certification authority, the intelligent electronic device being adapted for controlling a power electric device and being an embedded controller of a power electric device, the method comprising:
    enrolling a configuration tool at the certification authority;
    generating a one-time password for the intelligent electronic device and storing the one-time password in the certification authority and in the configuration tool, wherein the configuration tool requests a configuration certificate from the certification authority, the configuration tool authenticates itself at the certification authority with the configuration certificate, and the one-time password is encrypted with the configuration certificate of the configuration tool;
    connecting to the intelligent electronic device with the configuration tool, wherein the configuration tool authenticates at the intelligent electronic device;
    sending the one-time password from the configuration tool to the intelligent electronic device, wherein the one-time password is included in configuration data sent to the intelligent electronic device wherein the configuration data furthermore includes at least one of an address of the certification authority and/or a root certificate of the certification authority;
    enrolling the intelligent electronic device at the certification authority with the one-time password and registering the intelligent electronic device with the certification authority, wherein the one-time password is included into RA/CA registration data created by the intelligent electronic device from the configuration data;
    receiving a device certificate from the certification authority in the intelligent electronic device.

9. A system for registering intelligent electronic devices with a certification authority, the system comprising:
    a configuration tool; and
    a plurality of intelligent electronic devices being adapted for controlling power electric devices and being embedded controllers of the power electric devices;
    wherein the configuration tool is adapted for:
        enrolling at the certification authority for requesting a one-time password for each of the intelligent electronic devices from the certification authority or for providing a one-time password for each of the intelligent electronic devices to the certification authority, wherein the configuration tool requests a configuration certificate from the certification authority, the configuration tool authenticates itself at the certification authority with the configuration certificate, and the one-time password is encrypted with the configuration certificate of the configuration tool;

connecting to each of the intelligent electronic devices and authenticating at the respective intelligent electronic device; and sending the respective one-time password to the respective intelligent electronic device, wherein the one-time password is included in configuration data sent to the intelligent electronic device wherein the configuration data furthermore includes at least one of an address of the certification authority and/or a root certificate of the certification authority;

wherein each intelligent electronic device is adapted for:

enrolling at the certification authority with the one-time password, wherein the one-time password is included into RA/CA registration data created by the intelligent electronic device from the configuration data; and receiving a device certificate from the certification authority.

10. The system of claim 9, wherein the configuration tool, the intelligent electronic devices and the certification authority are interconnected via a data communication network.

11. The method of claim 7, further comprising:

requesting an authentication from a user of the configuration tool and authorising the user by the certification authority for the configuration tool.

12. The method of claim 11, wherein the one-time password is requested online via a secure communication connection;

wherein the one-time password is requested via a TLS and/or HTTPS connection;

wherein the configuration tool authenticates at the intelligent electronic device with a user password;

wherein the user password for the authentication of the configuration tool at the intelligent electronic device is a standard password used for more than one intelligent electronic device.

13. The method of claim 12, further comprising:

providing the configuration tool with a list of intelligent electronic devices;

generating different one-time passwords for the intelligent electronic devices in the list;

enrolling every intelligent electronic device from the list at the certification authority with its one-time password.

14. The method of claim 13, wherein the configuration tool is connected with the intelligent electronic device via a secure communication connection;

wherein the one-time password is sent from the configuration tool to the intelligent electronic device via a TLS and/or HTTPS connection;

wherein the one-time password is included in configuration data sent to the intelligent electronic device;

wherein the configuration data furthermore include at least one of an address of the certification authority and/or a root certificate of the certification authority;

wherein enrolling the intelligent electronic device with the certification authority is based on the Simple Certificate Enrolment Protocol or the Enrollment over Secure Transport protocol.

* * * * *